Figure 1:
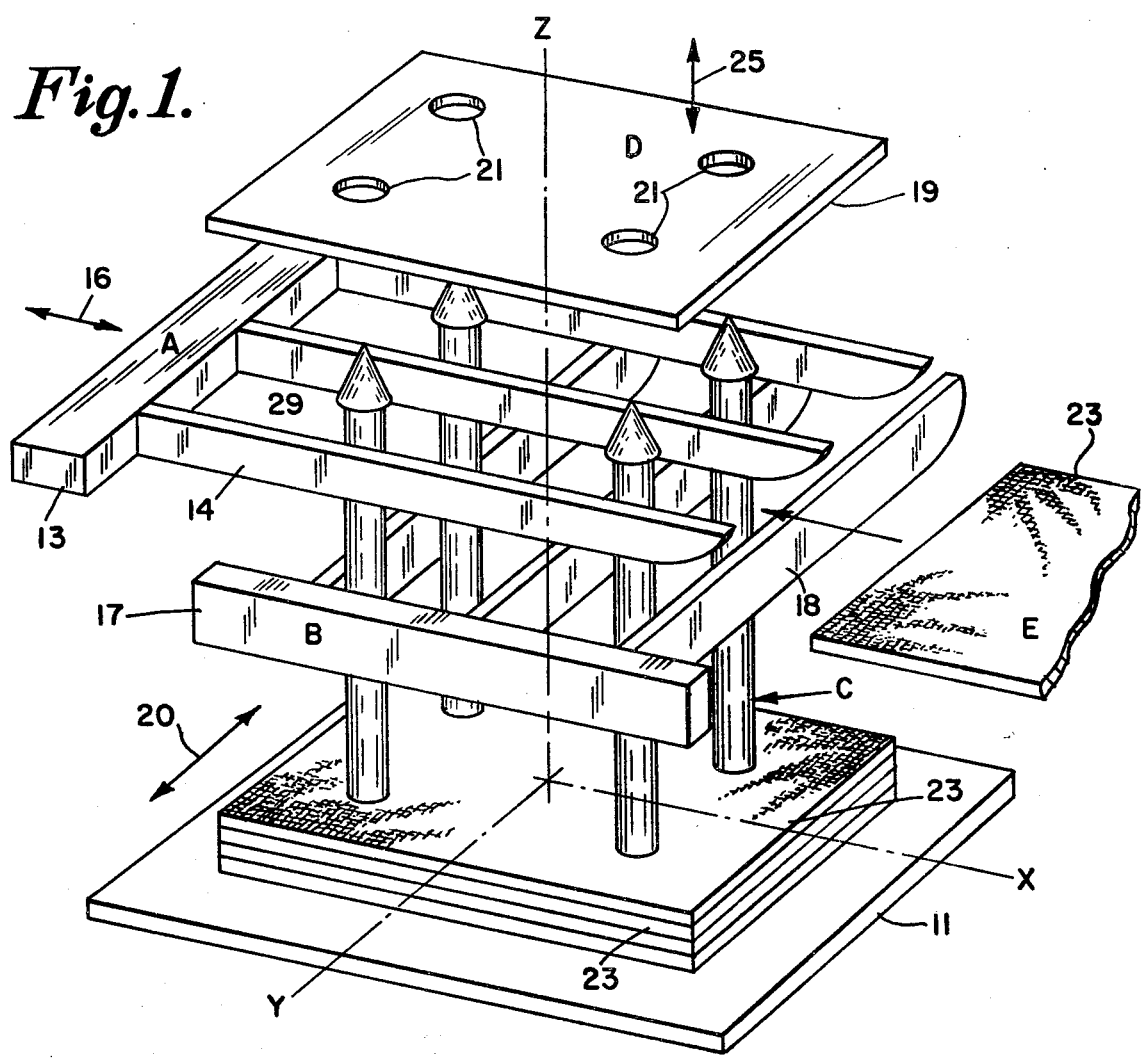

United States Patent [19]

King

[11] 4,218,276
[45] Aug. 19, 1980

[54] METHOD FOR MAKING 3-D STRUCTURES

[75] Inventor: Robert W. King, Lexington, Mass.

[73] Assignee: Avco Corporation, Wilmington, Mass.

[21] Appl. No.: 516,430

[22] Filed: Oct. 16, 1974

Related U.S. Application Data

[63] Continuation of Ser. No. 240,177, Mar. 31, 1972, abandoned.

[51] Int. Cl.² ............................................. B32B 7/08
[52] U.S. Cl. ..................................... 156/92; 156/148; 156/252; 156/253; 156/256; 156/303.1; 156/305; 156/307.3; 102/105
[58] Field of Search ................. 156/92, 148, 252, 253, 156/256, 303.1, 305, 306; 102/105

[56] References Cited

U.S. PATENT DOCUMENTS 3,837,985  9/1974  Chase ............................ 102/105 X

*Primary Examiner*—Stephen J. Lechert, Jr.
*Attorney, Agent, or Firm*—Abraham Ogman; Charles M. Hogan.

[57] ABSTRACT

The invention is directed to a method and machine for making 3-D structures. Briefly, the 3-D structure is formed by piercing layers of over-lying fabric with needles and then threading filamentary reinforcement through the passages formed in the layers of fabric by the needles to form the 3-D structure.

13 Claims, 2 Drawing Figures

U.S. Patent  Aug. 19, 1980  4,218,276

METHOD FOR MAKING 3-D STRUCTURES

The invention herein described was made in the course of or under a contract or subcontract thereunder with the Department of Defense.

This is a continuation of application Ser. No. 240,177 filed Mar. 31, 1972 now abandoned.

This invention relates to 3-D structures of the type described in the co-pending application "Three-Dimensional Fabric Material," Ser. No. 675,367, filed Oct. 16, 1967 and assigned to the same Assignee as this application. The invention also relates to 3-D structures of the type described in the September, 1967 issue of *Tooling and Production* in pages 83–88.

For purposes of this discussion, a 3-D structure is defined to mean a structure formed from filaments directed along three mutually angularly displaced axes. Usually these axes are mutually orthogonal and are referred to as the X, Y and Z axes. In special cases, these axes are not mutually orthogonal. 3-D structures are generally impregnated with a resin which is cured to form a reinforced composite.

Briefly, the prior art methods of making 3-D structures as described in the foregoing references provide for weaving alternating X and Y axes oriented filaments through an array of Z oriented tubes to form courses or layers. Each course contains filaments oriented in the X or Y direction.

When the column of filaments in the X-Y direction has reached a predetermined height reinforcing threads are inserted through the Z oriented tubes. The Z oriented tubes are removed thereby providing a 3-D structure.

It is an object of the invention to provide a method of making a 3-D structure which avoids the limitations and disadvantages of prior methods.

Another object of the invention is to provide a method for constructing a 3-D structure which utilizes a fabric for providing reinforcement in two directions and filamentary reinforcement passing through the fabric in a third direction to form the 3-D structure.

Still another object of the invention is to provide a machine for making a 3-D structure utilizing layers of fabric.

Still another object of the invention is a 3-D structure containing layers of fabric pierced by filamentary reinforcement.

Figure 2:
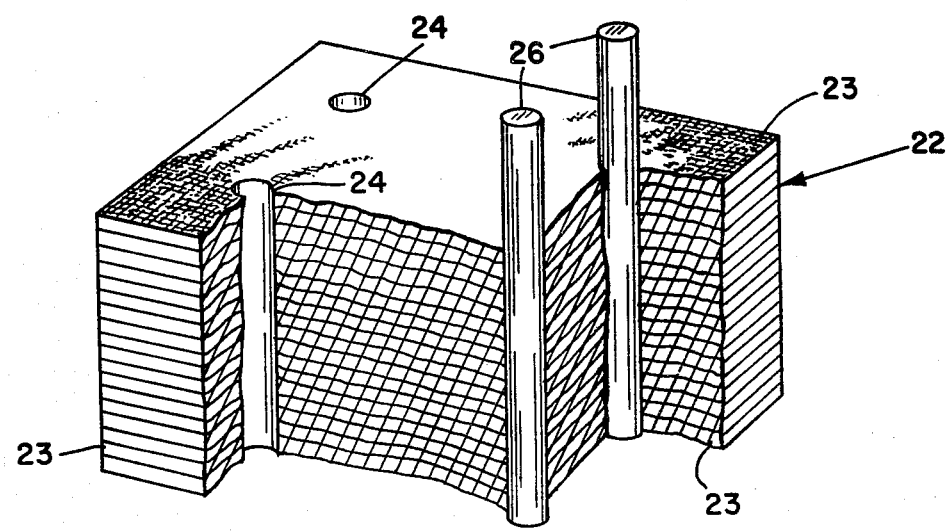

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a schematic representation of a machine for making a 3-D structure using fabric which embodies the principles of the invention; and FIG. 2 is a completed 3-D structure, with cutouts showing its structure.

Referring to FIG. 1, there is depicted therein a base 11 from which extends, in a vertical direction, a plurality of parallel needles 12 forming an array of spaced needles 12.

The unsupported ends of each of the needles 12 terminates in a point 29.

A first aligning means 13 containing a plurality of co-planar fingers 14 is provided. The purpose of alignment means is to maintain the spatial relationship of the needles 12 with respect to the X and Y directions; i.e., the portion of the needles with respect to orthogonal cross-sectional plane through the array.

One form of alignment means is represented by the structures 13 and 17. The aligning means 13 can reciprocate along the X axis as represented by the arrow 16 out of and into the array. The fingers 14 are parallel to each other and oriented parallel to X axis. They are normally placed as shown in the array of needles 12 so that the fingers maintain the spatial relationship of the needles 12 along the Y axis.

A second aligning means 17 is substantially similar in construction to the aligning means 16. Aligning means 17 can reciprocate along the Y axis per arrow 20. A plurality of fingers 18 of the second aligning means 17 are oriented along the Y axis so as to maintain the spatial relationship of the needles in the X direction.

Aligning means 13 and 17 are displaced vertically as shown so that they will not interfere with one another.

A plate 19 is located above and spaced from the needles 12. The plate 19 contains a plurality of holes 21 arranged in the same spatial relationship as the needles 12. Plate 19 can reciprocate vertically along the Z direction. See arrow 25.

In FIG. 2 there is shown a 3-D structure 22. The 3-D structure 22 is constructed from a plurality of overlying layers of fabric 23. As illustrated in the partial cutout, each fabric is pierced so that the structure contains a plurality of passages 24. A pair of filamentary reinforcements 26 are shown inserted through two of the passages 24 to illustrate the three-dimensional nature of the structure 22.

To form the FIG. 2 structure using the machine depicted in FIG. 1, a layer of fabric 23, in FIG. 1, is placed over the needles 12. The plate 19 is brought down on the fabric causing the pointed ends 29 of the needles to pierce the fabric and the holes 21. The base 11 and the plate 19 now maintain the spatial orientation of the needles 12. The plate continues its downward movement until it rests on the fingers 14. The aligning means 13 and 17 are removed and the base 11 is brought up toward the plate 19 to push up the fabric. In the alternative, the plate may continue its downward movement until it carries the layer of fabric 23 to the base 11.

It is not practical to move the base 11 and the needles 12 upward in the first instance as the ends 29 of the needles tend to sway out of alignment with the holes 21 in the plate 19. This is particularly true where there are a great many of closely spaced needles 12.

After the fabric is placed on the base 11, plate 19 is brought up adjacent to the ends of the needles. It is not removed from the needle array until aligning means 13 and 17 are replaced to maintain, with accuracy, the spatial relationship of the needles 12. With the aligning means in place, the plate 19 may now be raised out of contact with the needles.

A second layer of fabric is placed on the needles and the aforementioned procedure is repeated.

Eventually, enough layers of fabric are provided to make a column of fabric to a predetermined height. At this point, the needles are slowly withdrawn from the layers of fabric and replaced by a filamentary reinforcement 26 as shown in FIG. 2.

In many applications, it is preferred to have as dense a structure as possible. In this case, a compressive force may be brought to bear on the plate 19 with the aligning means 13 and 17 withdrawn to compress the layers of fabric around the needles 12. Alternatively, the compression step may take place after the filamentary reinforcement is in place.

After compression, the manufactured structure is a free-standing, high density, 3-D structure. It is generally impregnated with a matrix material to form a reinforced composite structure. The uses of such a structure are manifold; e.g., brakes, bearings, structural members, etc.

The fabric and the filamentary reinforcement may be any of the conventional materials such as glass, quartz, graphite, or combinations of these, etc. The matrix material is also not a critical quantity. In many cases, it is a phenolic resin or an epoxy system, though it may also be a carbonaceous pitch.

If the needles are extremely fine, the filamentary reinforcement 26 may be in the form of a monofilament, a plurality of monofilaments, or a thread formed from staple fibers. On occasion using thicker needles 12, the filamentary reinforcement may be reinforced composite such as a resin matrix composite fully cured. B-stage fiber reinforced resin matrix composite may also be used.

Further, the needle 12 may be made from a composite containing reinforcing filaments of glass, quartz, graphite, boron, etc., and a matrix such as a plastic resin system.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A method of fabricating a 3-D structure comprising the steps of:
   providing a plurality of layers of a reinforcing fabric;
   piercing said layers to provide a plurality of prearranged spaced passges through said fabric layers; and
   threading filamentary reinforcement through said passages to fill said passages to form a 3-D structure.

2. A method as described in claim 1 wherein said filamentary reinforcement is taken from the class consisting essentially of monofilament, a plurality of monofilaments, or a thread of staple fibers.

3. A method as described in claim 1 which includes the step of compressing said layers around said filamentary reinforcement to form a compressed free-standing structure.

4. A method as described in claim 1 which includes in addition the step of impregnating said 3-D structure with a matrix material to form a reinforced composite.

5. A method of fabricating a 3-D structure comprising the steps of:
   providing a plurality of parallel needles oriented with an axis;
   placing layers of fabric, in succession, over the needles and piercing each of said layers of fabric, said pierced layers of fabric forming a column of overlying layers; and
   removing said needles and threading filamentary reinforcement in the passages formed by said needles in the column of fabric and replacing said needles with filamentary reinforcements.

6. A method as described in claim 5 wherein said filamentary reinforcements are taken from the class consisting essentially of a B-staged reinforced resin composite material or a composite comprising filaments disposed within a matrix.

7. A method as described in claim 5 in which said filamentary reinforcement is taken from the class consisting essentially of monofilament, a plurality of monofilaments, or a thread of staple fibers.

8. A method as described in claim 5 which includes the step of compressing said layers around said filamentary reinforcement to form a compressed free-standing structure.

9. A method as described in claim 5 which includes, in addition, the step of impregnating said 3-D structure with a matrix material to form a composite structure.

10. A method of making a 3-D structure which comprises the steps of:
    providing a plurality of parallel spaced needles oriented along an axis and maintaining the spatial relationship of the needles with an alignment means;
    placing a piece of fabric on ends of said needles and piercing said fabric with said needles;
    using a plate with holes corresponding to the spatial arrangement of the needles to pierce said fabric and move said fabric along the length of said needles;
    removing said alignment means and sliding said piece of fabric toward said base;
    moving said plate to said exposed ends of said needles and replacing said alignment means; and
    removing said plate out of contact with said needles and placing another piece of fabric on the ends of said needles.

11. A method as described in claim 1 wherein said filamentary reinforcements are taken from the class consisting essentially of a B-staged reinforced resin composite material or a composite comprising filaments disposed within a matrix.

12. A method of fabricating an improved, rigid, ablative multi-directional reinforced unitary composite structure which method comprises:
    (a) laying up uncured, resin impregnated, multi-directional, fibrous material;
    (b) driving a series of rigid, spaced, cured, resin impregnated fibrous reinforcing rods at least partially through said lay-up at a first angle to the surface of said lay-up; and
    (c) thereafter fully curing and rigidifying the resulting reinforced composite ablative structure to bond said reinforcing rods to said lay-up.

13. The method of claim 12 wherein before said curing said lay-up comprises stacked sheets of two-directional woven, high temperature resistant fibrous material impregnated with uncured thermosetting resin and wherein before said curing said reinforcing rods comprise high temperature resistant material impregnated with cured thermosetting resin compatible with said resin of said sheets.

* * * * *